March 2, 1926.  
E. D. OSBORNE  
FOOT PEDAL  
Filed Nov. 6, 1925  
1,575,224
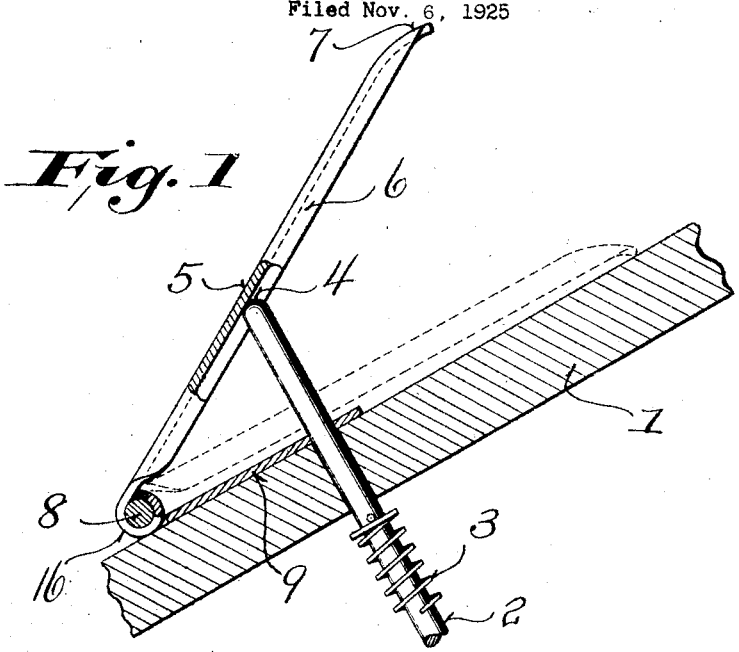
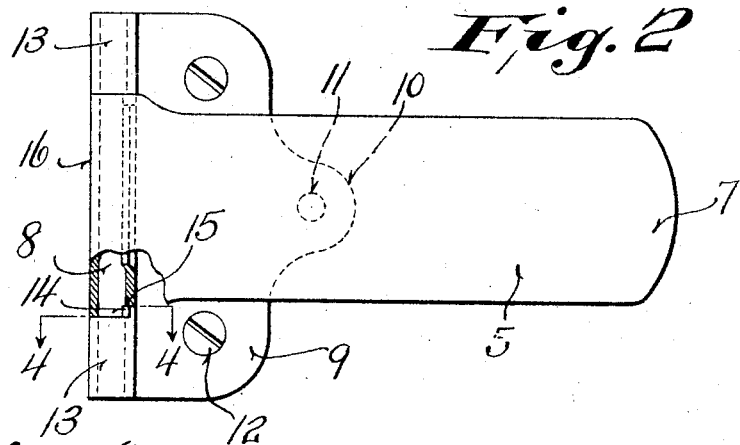
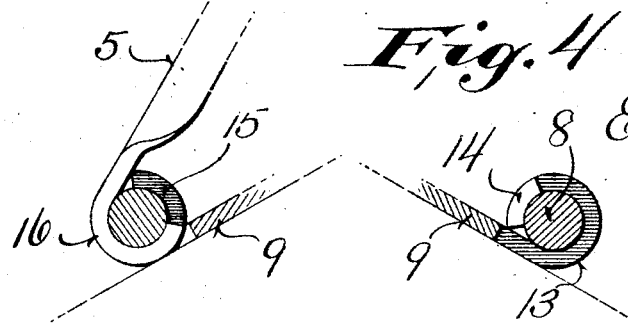
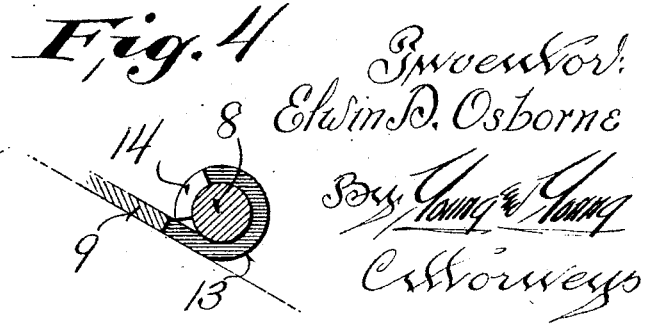
Inventor:  
Edwin D. Osborne  
By Young & Young  
Attorneys Patented Mar. 2, 1926.

1,575,224

UNITED STATES PATENT OFFICE.

ELWIN D. OSBORNE, OF RACINE, WISCONSIN.

FOOT PEDAL.

Application filed November 6, 1925. Serial No. 67,275.

*To all whom it may concern:*

Be it known that I, ELWIN D. OSBORNE, a citizen of the United States, and resident of Racine, in the county of Racine and State of Wisconsin, have invented certain new and useful Improvements in Foot Pedals; and I do hereby declare that the following is a full, clear, and exact description thereof.

This invention relates to foot pedals and is particularly directed to an accelerator pedal.

Objects of this invention are to provide a pedal which is particularly adapted for use in operating the accelerator rod of automobiles and to so construct the pedal that it may be made of sheet metal in a very simple manner to allow the article to be cheaply marketed.

Further objects are to provide a sheet metal accelerator pedal in which provision is made in the base for guiding the accelerator rod, in which a channel construction is employed to increase the strength of the device, and in which means are provided of a very simple nature for limiting the upward motion of the pedal.

An embodiment of the invention is shown in the accompanying drawings, in which:—

Figure 1 is a side elevation partly in section showing the pedal in position.

Figure 2 is a plan view of the pedal, such view being partly broken away.

Figure 3 is a fragmentary end view of the movable portion of the pedal.

Figure 4 is an enlarged sectional view on the line 4—4 of Figure 2.

Referring to the drawings, it will be seen that the floor board of an automobile has been indicated at 1 and the accelerator rod at 2. This accelerator rod is urged upwardly by means of a spring 3 or in any suitable manner. Its upper end is rounded, as indicated at 4, and fits below the movable portion 5 of the accelerator pedal. This movable portion 5 is made from sheet metal and is provided with marginal flanges 6 to increase its strength and with a rounded end portion, as indicated at 7. Its lower end is wrapped about the pintle pin 8 to provide a hinge-like connection with the base 9. This base 9 is also formed of sheet metal, as shown, and is provided with a projecting portion 10 apertured, as indicated at 11 (see Figure 2) to provide a metal guide for the accelerator rod 2. It is adapted to be secured to the floor board 2 by means of counter sunk screws 12.

The base portion has its central part cut away adjacent the pintle pin 8, as may be seen from Figures 2 and 3, and has its projecting ears rolled about the pintle pin, as indicated at 13. These rolled portions are provided with projections 14 which fit within recesses 15 (see Figures 1 and 3) such recesses being formed in the rolled portion 16 of the movable member 5. It is to be noted that the projections 14 are of less extent than the recesses 15 to thus permit a limited rocking motion of the movable member.

In operating the device, it is merely necessary for the driver to place his foot upon the pedal when it is desired to accelerate the machine, such pedal depressing the rod 2, as clearly shown in Figure 1. Upon relieving the pressure of the foot, the spring will force the pedal upwardly through the medium of the rod 2. Its upward motion, however, is limited by means of the lugs 14 and the cooperating recesses 15.

It will be seen that a very simple type of foot accelerator pedal has been developed by this invention, and that the device may be formed from sheet metal with a minimum of expense.

Although the invention has been described in considerable detail, it is to be understood that the invention may be variously embodied and is, therefore, to be limited only as claimed.

I claim:

1. An accelerator pedal for automobiles having a floor board and an accelerator rod, said accelerator comprising a sheet metal base member adapted to be secured to the floor board, a movable sheet metal member, a pintle pin pivotally joining said movable member and said base member, said movable member and said base member having projecting lugs and recesses cooperating to limit the upward motion of the movable member.

2. The combination of the floor board and accelerator rod of an automobile, an accelerator pedal for operating said rod comprising a sheet metal base member secured to said floor board and having an aperture for guiding said accelerator rod, a movable sheet metal member, a pintle pin joining said members in a hinge-like relation, said movable member and said base member having portions wrapped about said pintle pin, and having recesses and cooperating lugs for limiting the upward motion of the movable member.

In testimony that I claim the foregoing I have hereunto set my hand at Racine, in the county of Racine and State of Wisconsin.

ELWIN D. OSBORNE.